United States Patent
Zhu et al.

(10) Patent No.: US 9,414,379 B2
(45) Date of Patent: Aug. 9, 2016

(54) WIRELESS COMMUNICATION PRECODER DETERMINATION

(71) Applicant: FUJITSU LIMITED, Kawasaki-shi, Kanagawa (JP)

(72) Inventors: Chenxi Zhu, Fairfax, VA (US); Dorin Viorel, Calgary (CA); Huy Dung Han, Santa Clara, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/109,650

(22) Filed: Dec. 17, 2013

(65) Prior Publication Data

US 2014/0204779 A1  Jul. 24, 2014

Related U.S. Application Data (60) Provisional application No. 61/754,855, filed on Jan. 21, 2013.

(51) Int. Cl.
| | |
|---|---|
| *G01R 31/08* | (2006.01) |
| *H04W 72/04* | (2009.01) |
| *H04L 25/02* | (2006.01) |
| *H04L 25/03* | (2006.01) |
| *H04L 12/26* | (2006.01) |

(52) U.S. Cl.
CPC ......... *H04W 72/044* (2013.01); *H04L 25/0202* (2013.01); *H04L 25/03343* (2013.01); *H04L 43/065* (2013.01); *H04L 43/08* (2013.01)

(58) Field of Classification Search
CPC .................................................... H04W 72/044
USPC ................... 370/252–281, 328–339
See application file for complete search history.

(56) References Cited

U.S. PATENT DOCUMENTS

| 8,768,261 B2 | 7/2014 | Tong et al. | |
|---|---|---|---|
| 8,780,830 B2 * | 7/2014 | Doppler et al. | ............... 370/329 |
| 2010/0261469 A1 * | 10/2010 | Ribeiro et al. | ................ 455/423 |

FOREIGN PATENT DOCUMENTS

EP  2 410 781 A1  1/2012

OTHER PUBLICATIONS

Huy-Dung Han et al: "Resource Allocation and Beamforming Algorithm Based on Interference Avoidance Approach or Device-to-Device Communication Underlaying LTE Cellular Network", Communications and Network Scientific IFIC Research, vol. 5, No. 3, pp. 367-373, Nov. 12, 2013.

(Continued)

*Primary Examiner* — Iqbal Zaidi
(74) *Attorney, Agent, or Firm* — Maschoff Brennan (57) ABSTRACT

According to an aspect of an embodiment, a method of determining a precoder for wireless communications may include acquiring first channel information associated with a first channel between a first node of a wireless communication network and a second node of the wireless communication network. The first node may be configured to transmit a first wireless signal in a wireless communication resource to the second node via the first channel. The method may further include acquiring second channel information associated with a second channel between the first node and a third node of the wireless communication network. The third node being may be configured to receive a second wireless signal transmitted in the wireless communication resource. Additionally, the method may include determining a precoder for transmission of the first wireless signal based on the first channel information and the second channel information.

18 Claims, 3 Drawing Sheets

(56) References Cited

OTHER PUBLICATIONS

Mirette Sadek et al: "A Leakage-Based Precoding Scheme for Downlink Multi-User MIMO Channels", IEEE Transactionson Wireless Communications, IEEE Service Center, Piscataway, NJ, US, vol. 3, No. 5, pp. 1711-1721, May 1, 2007.
European Search Report dated Nov. 17, 2015 in application No. 14151637.7.

* cited by examiner

WIRELESS COMMUNICATION PRECODER DETERMINATION

CROSS-REFERENCE TO RELATED APPLICATIONS

This application is based upon and claims the benefit of priority of U.S. Provisional Application No. 61/754,855, filed on Jan. 21, 2013, the entire contents of which are incorporated herein by reference.

FIELD

The present disclosure relates to wireless communication precoder determination.

BACKGROUND

The proliferation of smartphones, tablets, laptop computers, and other electronic devices (referred to generally as "wireless devices") that use wireless communication networks has created an increased demand for ubiquitous and continuous wireless voice and data access. Being able to reuse and share wireless communication resources between wireless devices may help satisfy this demand. One way to reuse and share wireless communication resources is through device-to-device (D2D) communication. D2D communication may allow wireless devices to directly communicate information with each other using lower power transmissions than by communicating with each other via an access point (e.g., a base station). Using lower power transmissions may allow for increased use of the same wireless communication resources in a particular area.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of determining a precoder for wireless communications may include acquiring first channel information associated with a first channel between a first node of a wireless communication network and a second node of the wireless communication network. The first node may be configured to transmit a first wireless signal in a wireless communication resource to the second node via the first channel. The method may further include acquiring second channel information associated with a second channel between the first node and a third node of the wireless communication network. The third node being may be configured to receive a second wireless signal transmitted in the wireless communication resource. Additionally, the method may include determining a precoder for transmission of the first wireless signal based on the first channel information and the second channel information.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Precoding of wireless signals may be used in wireless communications to transmit the wireless signals at certain phases and transmission powers to help optimize received signal power at a desired receiving node. For example, precoding may be performed at a wireless device for transmitting an uplink (UL) signal to an access point of a wireless communication network to help optimize the signal power of the uplink signal as received by the access point. The precoding may be performed based on a determined precoder.

As detailed below, in some embodiments, a precoder for a first wireless signal transmitted in a wireless communication resource (e.g., a frequency bands, time slot, etc.) from a first node of a wireless communication network to a second node of the wireless communication network may be determined. The precoder may be determined based on first channel information associated with a first signal path (referred to hereinafter as a "first channel") between the first node and the second node. Additionally, the precoder may be determined based on second channel information associated with a second signal path (referred to hereinafter as a "second channel") between the first node and a third node of the wireless communication network. In these and other embodiments, the third node may be configured to receive a second wireless signal transmitted in the same wireless communication resource as the first wireless signal. In some embodiments, the precoder may be determined based on the first channel information and the second channel information such that interference of the second wireless signal at the third node that may be caused by the first wireless signal may be reduced. In contrast, conventional precoder determinations may not consider potential interference.

In some embodiments, determining the precoder as indicated above and as described in detail below may reduce interference that may be caused by sharing the same wireless communication resources, which in turn may facilitate and/or improve the shared use of the same wireless communication resources. In particular embodiments, a wireless communication resources may be shared between one or more device-to-device (D2D) pairs performing D2D communication and other wireless device and/or access points performing traditional cellular type communication. For example, the same uplink channel resources may be used simultaneously or approximately simultaneously for both D2D communications and cellular communications from one or more wireless devices to an access point (e.g., base station) of a wireless communication network.

Although in some regards all the wireless communications described herein may be referred to as "cellular" type communications, to differentiate between communications between a D2D pair and communications between a wireless device and an access point, communications between a wireless device and the access point (e.g., uplink and downlink communications between the wireless device and the access point) may be generally referred to hereinafter as "cellular communications" and communications between a D2D pair may be referred to hereinafter as "D2D communications." Additionally, although the wireless devices of the D2D pair may be referred to in some regards as "cellular" type devices, wireless devices performing D2D communications may be referred to hereinafter as "D2D wireless devices" and wireless devices performing cellular communications may be referred to hereinafter as "cellular wireless devices." Additionally, a signal transmitted by a transmitting D2D wireless device that may be associated with D2D communications may be referred to as a "D2D signal" and a signal transmitted by a cellular wireless device that may be associated with cellular communications may be referred to as a "cellular signal."

Embodiments of the present disclosure will be explained with reference to the accompanying drawings. To facilitate the discussion, the description given with respect to the figures is given in the context of when uplink channel resources may be used in D2D communications as well as traditional uplink communications. However, the principles described herein for determining precoders may be used anytime the same wireless communication resources may be shared by multiple nodes of a wireless communication network in a manner where the corresponding wireless communications may interfere with each other.

Figure 1:
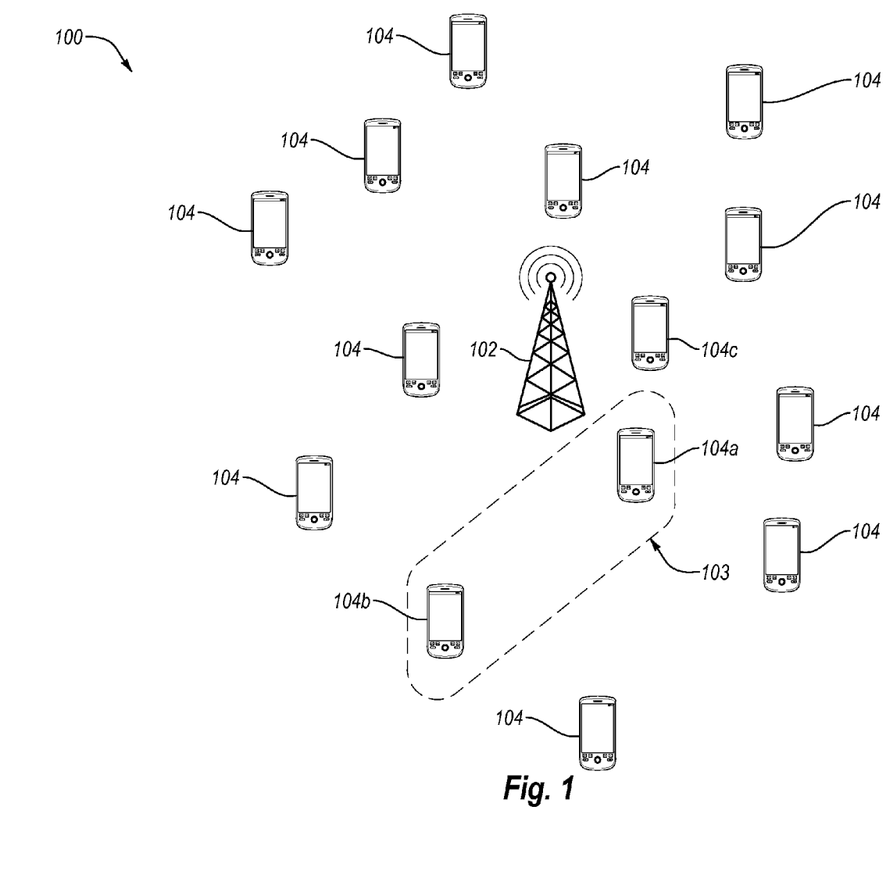
FIG. 1 illustrates an example wireless communication network configured to perform precoding.

FIG. 1 illustrates an example wireless communication network 100 (referred to hereinafter as "network 100") configured to perform precoding, arranged in accordance with at least one embodiment of the present disclosure. The network 100 may be configured to provide wireless communication services to one or more wireless devices 104 via one or more access points 102. The wireless communication services may be voice services, data services, messaging services, and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, and/or any other suitable wireless communication network. In some embodiments, the network 100 may be configured as a third generation (3G) wireless communication network and/or a fourth generation (4G) wireless communication network. In these or other embodiments, the network 100 may be configured as a long term evolution (LTE) wireless communication network.

The access point 102 may be any suitable wireless communication network communication point and may include, by way of example but not limitation, a base station, an evolved node "B" (eNB) base station, a remote radio head (RRH), or any other suitable communication point. The wireless devices 104 may include any devices that may use the network 100 for obtaining wireless communication services and may include, by way of example and not limitation, a cellular phone, a smartphone, a personal data assistant (PDA), a laptop computer, a personal computer, a tablet computer, or any other similar device.

In some embodiments, the network 100 may be configured to supervise D2D communication between wireless devices 104. In some of these embodiments, the access point 102 may be configured to allocate wireless communication resources to a D2D pair. In some embodiments, the wireless communication resources may be assigned to the D2D pairs during a determination of D2D transmission parameters such as that described in U.S. patent application Ser. No. 13/830,342 by Zhu et al., filed on Mar. 14, 2013, and entitled "NETWORK SUPERVISED DEVICE-TO-DEVICE COMMUNICATION," the entire contents of which are incorporated herein by reference.

Additionally, in some embodiments, the D2D pair may be selected based on neighbor discovery such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS," the entire contents of both of which are incorporated herein by reference.

In the illustrated example, a wireless device 104a and a wireless device 104b may be configured as a D2D pair 103, and the access point 102 may be configured to allocate wireless communication resources to the D2D pair 103. Further, in the illustrated example, the wireless device 104a may be configured to transmit D2D signals to the wireless device 104b such that the wireless device 104b may receive the D2D signals. Therefore, the wireless device 104a may be referred to as a "transmitting D2D device 104a" with respect to the D2D pair 103 and the wireless device 104b may be referred to as a "receiving D2D device 104b" with respect to the D2D pair 103 in the illustrated example.

In some embodiments, the access point 102 may direct the transmitting D2D device 104a to transmit the D2D signals using uplink channel wireless communication resources (e.g., time slots, frequencies, etc.) (referred to hereinafter as "uplink channel resources") that may also be used by one or more other wireless devices 104 to communicate information to the access point 102. As detailed below, the access point 102 and/or the transmitting D2D device 104a may be configured to determine a precoder for a D2D signal that may be transmitted in an uplink channel resource by the transmitting D2D device 104a to the receiving D2D device 104b such that interference of uplink communications transmitted in the same uplink channel resource as caused by the D2D signal may be reduced. Additionally, the access point 102 and/or a cellular wireless device 104c may be configured to determine a precoder for an uplink signal transmitted by the cellular wireless device 104c in the same uplink channel resource as the D2D signal transmitted by the transmitting D2D device 104a such that interference of the D2D signal may be reduced.

Figure 2:
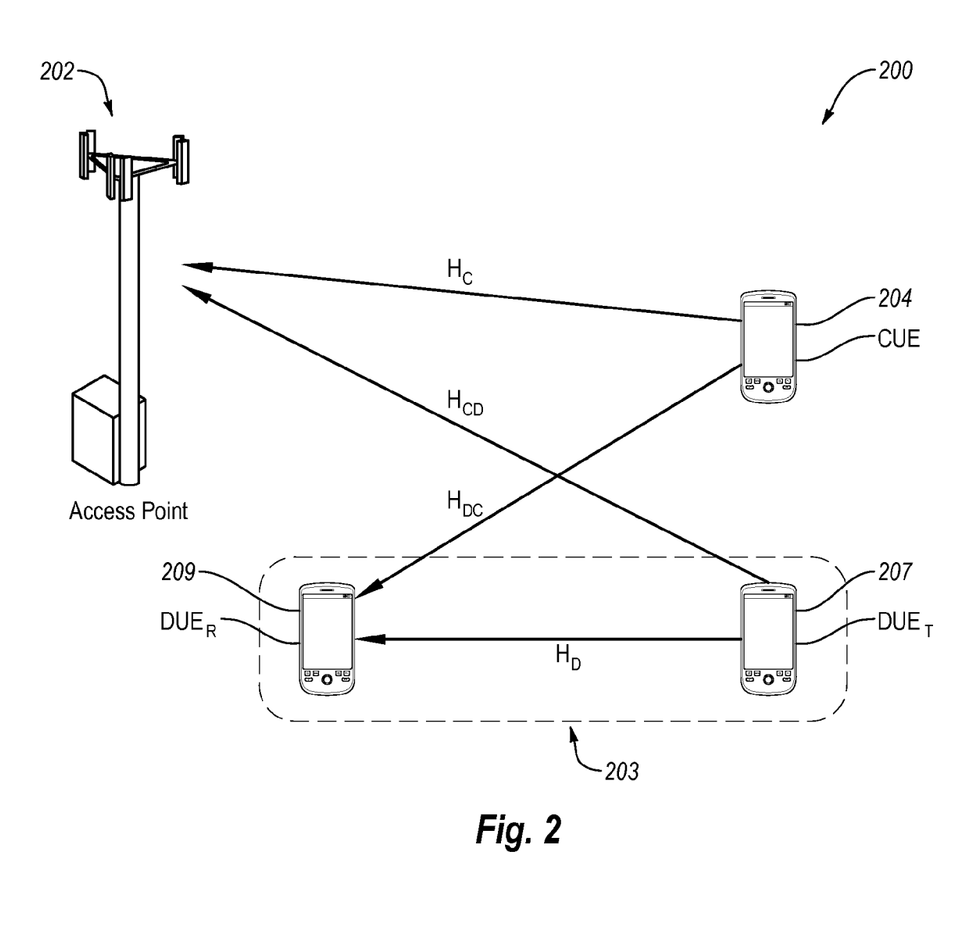
FIG. 2 illustrates an example wireless communication network where uplink channel resources may be shared by a D2D pair and a cellular wireless device.

FIG. 2 illustrates an example wireless communication network 200 (referred to hereinafter as "the network 200") where uplink channel resources may be shared by a D2D pair 203 and a cellular wireless device (CUE) 204, in accordance with at least one embodiment described herein. In the illustrated embodiment, the D2D pair 203 may include a transmitting D2D device ($DUE_T$) 207 and a receiving D2D device ($DUE_R$) 209.

In the illustrated embodiment, the CUE 204 may be configured to perform cellular communications with an access point 202 such that the CUE 204 may transmit uplink signals to the access point 202 via an uplink propagation channel $H_C$. Further, the $DUE_T$ 207 may transmit D2D signals to the $DUE_R$ 209 via a D2D propagation channel $H_D$. In some embodiments, information related to the D2D propagation channel $H_D$ may be determined based on a D2D reference signal transmitted by the $DUE_T$ 207.

In some embodiments, the CUE 204 may transmit the uplink signals and the $DUE_T$ 207 may transmit the D2D signals using substantially the same or the same uplink channel resources. As such, the uplink signals transmitted by the CUE 204 that may be intended for the access point 202 may also be received by the $DUE_R$ 209 via a propagation channel $H_{DC}$ that may exist between the CUE 204 and the $DUE_R$ 209. Additionally, D2D signals transmitted by the $DUE_T$ 207 and intended for the $DUE_R$ 209 may also be received by the access point 202 via a propagation channel $H_{CD}$ that may exist between the $DUE_T$ 207 and the access point 202.

As discussed in further detail below, precoders may be determined for the D2D signals and/or the uplink signals such that interference of uplink communications between the CUE 204 and the access point 202 by the D2D signals and/or interference of D2D communications between the $DUE_T$ 207 and the $DUE_R$ 209 by the uplink signals may be reduced. For example, in some embodiments, a D2D precoder may be determined for a D2D signal transmitted from the $DUE_T$ 207 to the $DUE_R$ 209 based on channel information associated with the channel $H_D$ (referred to hereinafter as "$H_D$ channel information") and channel information associated with the channel $H_{CD}$ (referred to hereinafter as "$H_{CD}$ channel information") such that interference of uplink communications at the access point 202 by the D2D signal may be reduced. In some embodiments, the D2D precoder may be selected to maximize a signal-to-leakage-and-noise (SLNR) ratio of the D2D signal with respect to the uplink communications based on the $H_D$ channel information and the $H_{CD}$ channel information. The access point or the $DUE_T$ may determine the D2D precoder depending on the implementation.

In these or other embodiments, an uplink precoder may be determined for an uplink signal transmitted from the CUE 204 to the access point 202 based on channel information associated with the channel $H_C$ (referred to hereinafter as "$H_C$ channel information") and channel information associated with the channel $H_{DC}$ (referred to hereinafter as "$H_{DC}$ channel information") such that interference of D2D communications at the $DUE_R$ 209 by the uplink signal may be reduced. In some embodiments, the uplink precoder may be selected to maximize a signal-to-leakage-and-noise (SLNR) ratio of the uplink signal with respect to the D2D communications based on the $H_C$ channel information and the $H_{DC}$ channel information. The access point 202 or the CUE 204 may determine the uplink precoder depending on the implementation.

The channel information (e.g., $H_D$, $H_{CD}$, $H_C$, and/or $H_{DC}$ channel information) used to determine the precoders may be determined using reference signals and any number of techniques. Below are some examples of how the $H_D$ channel information, the $H_{CD}$ channel information, the $H_C$ channel information, and the $H_{DC}$ channel information may be determined.

The $H_D$ channel information may be determined by the $DUE_T$ 207 and/or the $DUE_R$ 209. For example, in some embodiments, the $DUE_T$ 207 may be configured to transmit a reference signal (e.g., a sounding reference signal (SRS), a neighbor discovery signal, a downlink modulation reference signal (DM-RS)), which may be received by the $DUE_R$ 209 via the channel $H_D$. In some embodiments, the access point 202 may be configured to instruct the $DUE_T$ 207 to transmit the reference signal. Based on the reference signal, the $DUE_R$ 209 may be able to directly estimate the $H_D$ channel information in either a time division duplex (TDD) signaling scheme or a frequency division duplex (FDD) signaling scheme.

The $DUE_R$ 209 may be configured to communicate the estimated $H_D$ channel information to the $DUE_T$ 207 or the access point 202 such that the $DUE_T$ 207 or the access point 202 may acquire the $H_D$ channel information. Whether the estimated $H_D$ channel information is communicated from the $DUE_R$ 209 to the access point 202 or the $DUE_T$ 207 may depend on whether the access point 202 or the $DUE_T$ 207 determines the D2D precoder associated with a D2D signal communicated from the $DUE_T$ 207 to the $DUE_R$ 209. In some embodiments, the $DUE_R$ 209 may be configured to quantize the channel $H_D$ channel to communicate the estimated $H_D$ channel information to the $DUE_T$ 207 or the access point 202.

In some embodiments, the $DUE_R$ 209 may be configured to quantize the channel $H_D$ using a predefined, discrete set of quantized and normalized channels "QC." "QC" may be represented by the following expression: $QC=\{C_1, C_2, \ldots, C_K\}$, where "$C_1, C_2, \ldots, C_K$" represent the quantized and normalized channels. The channel $H_D$ may be quantized by normalizing the received $H_D$ channel information and selecting a channel "$C_i$" from "QC" that most closely matches that of the normalized $H_D$ channel information.

For example, the channel $H_D$ may be quantized based on the following expression:

$$s = \|H_D\|,$$
$$H_D^n = \frac{H_D}{s},$$
$$i = \mathrm{argmin}_{C_k \in QC} \|C_k - H_D^n\|$$

In the above expression, "$\|H_D\|$" may represent the magnitude of the estimated $H_D$ channel information and "$H_D^n$" may represent the normalized $H_D$ channel information. The $DUE_R$ 209 may communicate the selected channel "$C_i$" to the $DUE_T$ 207 or the access point 202. Additionally, in the above example, the $DUE_T$ 207 or the access point 202 may reconstruct the estimated $H_D$ channel information according to the following expression:

$$H_D = s C_i$$

In some embodiments, the $DUE_T$ 207 may be configured to determine the $H_D$ channel information instead of the $DUE_R$ 209 such that the $DUE_T$ 207 may acquire the $H_D$ channel information by locally determining (e.g., estimating) the $H_D$ channel information. For example, the $DUE_R$ 209 may be configured to transmit a reference signal (e.g., an SRS or a neighbor discovery signal), which may be received by the $DUE_T$ 207 via a signal path (also referred to as a channel) that is similar to that associated with the channel $H_D$. Based on the reference signal transmitted by the $DUE_R$ 209, the $DUE_T$ 207 may estimate channel information associated with the channel from the $DUE_R$ 209 to the $DUE_T$ 207.

In a TDD scheduling scheme, the channel from the $DUE_R$ 209 to the $DUE_T$ 207 may be symmetrical to the channel $H_D$ because the same frequencies may be used for D2D communications to or from the $DUE_T$ 207. Accordingly, when the $DUE_T$ 207 and the $DUE_R$ 209 operate in a TDD scheduling scheme, the $DUE_T$ 207 may estimate the $H_D$ channel information as being the same as the estimated channel information associated with the channel from the $DUE_R$ 209 to the $DUE_T$ 207.

Additionally, in some embodiments, the same frequencies (e.g., uplink frequencies) may be used for D2D communications to or from the $DUE_T$ 207 in an FDD scheduling scheme. Accordingly, in some embodiments, when the $DUE_T$ 207 and the $DUE_R$ 209 operate in an FDD scheduling scheme, the $DUE_T$ 207 may estimate channel information associated with the channel from the $DUE_R$ 209 to the $DUE_T$ 207 based on the reference signal transmitted by the $DUE_R$ 209. The $DUE_T$ 207 may then estimate the $H_D$ channel information as being the same as the estimated channel information associated with the channel from the $DUE_R$ 209 to the $DUE_T$ 207 because substantially the same frequencies may be used.

The $H_{CD}$ channel information may be determined by the $DUE_T$ 207 and/or the access point 202. For example, in some embodiments, the $DUE_T$ 207 may be configured to transmit a reference signal (e.g., an SRS), which may be received by the access point 202 via the channel $H_{CD}$. In some embodiments, the access point 202 may be configured to instruct the $DUE_T$ 207 to transmit the reference signal. Based on the reference signal, the access point 202 may be able to directly estimate the $H_{CD}$ channel information in either a TDD signaling scheme or a FDD signaling scheme. Therefore, the access point 202 may acquire the $H_{CD}$ channel information in some embodiments by locally determining the $H_{CD}$ channel information.

In some embodiments, the access point 202 may be configured to communicate the estimated $H_{CD}$ channel information to the $DUE_T$ 207 such that the $DUE_T$ 207 may acquire the $H_{CD}$ channel information by receiving the $H_{CD}$ channel information from the access point 202. In some embodiments, the access point 202 may be configured to quantize the channel $H_{CD}$ to communicate the estimated $H_{CD}$ channel information to the $DUE_T$ 207 in a manner similar to that described above with respect to quantizing the channel $H_D$. Whether the $H_{CD}$ channel information is communicated from the access point 202 to the $DUE_T$ 207 may depend on whether the access point 202 or the $DUE_T$ 207 determines the associated D2D precoder.

In some embodiments, the $DUE_T$ 207 may be configured to determine the $H_{CD}$ channel information instead of the access point 202 such that the $DUE_T$ 207 may acquire the $H_{CD}$ channel information by locally determining (e.g., estimating) the $H_{CD}$ channel information. For example, the access point 202 may be configured to transmit a reference signal (e.g., an SRS, a cell specific reference signal (CRS), a channel state information reference signal (CSI-RS), a DM-RS, etc.), which may be received by the $DUE_T$ 207 via a signal path (also referred to as a channel) that is similar to that associated with the channel $H_{CD}$. Based on the reference signal transmitted by the access point 202, the $DUE_T$ 207 may estimate channel information associated with the channel from the access point 202 to the $DUE_T$ 207.

For example, in a TDD scheduling scheme, the channel from the access point 202 to the $DUE_T$ 207 may be symmetrical to the channel $H_{CD}$ because of similar frequencies that may be used. Accordingly, when the $DUE_T$ 207 and the access point 202 operate in a TDD scheduling scheme, the $DUE_T$ 207 may estimate the $H_{CD}$ channel information as being the same as the estimated channel information associated with the channel from the access point 202 to the $DUE_T$ 207.

The $H_C$ channel information may be determined by the CUE 204 and/or the access point 202. For example, in some embodiments, the CUE 204 may be configured to transmit a reference signal (e.g., an SRS), which may be received by the access point 202 via the channel $H_C$. In some embodiments, the access point 202 may be configured to instruct the CUE 204 to transmit the reference signal. Based on the reference signal, the access point 202 may be able to directly estimate the $H_C$ channel information in either a TDD signaling scheme or a FDD signaling scheme. Therefore, the access point 202 may acquire the $H_C$ channel information in some embodiments by locally determining the $H_C$ channel information.

In some embodiments, the access point 202 may be configured to communicate the estimated $H_C$ channel information to the CUE 204 such that the CUE 204 may acquire the $H_C$ channel information by receiving the $H_C$ channel information from the access point 202. In some embodiments, the access point 202 may be configured to quantize the channel $H_C$ to communicate the estimated $H_C$ channel information to the CUE 204 in a manner similar to that described above with respect to quantizing the channel $H_D$. Whether the $H_C$ channel information is communicated from the access point 202 to the CUE 204 may depend on whether the access point 202 or the CUE 204 determines the uplink precoder associated with an uplink signal communicated from the CUE 204 to the access point 202.

In some embodiments, the CUE 204 may be configured to determine the $H_C$ channel information instead of the access point 202 such that the CUE 204 may acquire the $H_C$ channel information by locally determining (e.g., estimating) the $H_C$ channel information. For example, the access point 202 may be configured to transmit a reference signal (e.g., an SRS, a CRS, a CSI-RS, a DM-RS, etc.), which may be received by the CUE 204 via a signal path (also referred to as a channel) that is similar to that associated with the channel $H_C$. Based on the reference signal transmitted by the access point 202, the CUE 204 may estimate channel information associated with the channel from the access point 202 to the CUE 204.

In a TDD scheduling scheme, the channel from the access point 202 to the CUE 204 may be symmetrical to the channel $H_C$. Accordingly, when the CUE 204 and the access point 202 operate in a TDD scheduling scheme, the CUE 204 may estimate the $H_C$ channel information as being the same as the estimated channel information associated with the channel from the access point 202 to the CUE 204.

The $H_{DC}$ channel information may be determined by the CUE 204 and/or the $DUE_R$ 209. For example, in some embodiments, the CUE 204 may be configured to transmit a reference signal (e.g., an SRS), which may be received by the $DUE_R$ 209 via the channel $H_{DC}$. Based on the reference signal, the $DUE_R$ 209 may be able to directly estimate the $H_{DC}$ channel information in either a TDD signaling scheme or a FDD signaling scheme. The $DUE_R$ 209 may be configured to communicate the estimated $H_{DC}$ channel information to the CUE 204 or the access point 202 such that the CUE 204 or the access point 202 may acquire the $H_{DC}$ channel information. In some embodiments, the $DUE_R$ 209 may be configured to quantize the channel $H_{DC}$ to communicate the estimated $H_{DC}$ channel information to the CUE 204 or the access point 202 in a manner similar to that described above with respect to quantizing the channel $H_D$. Whether the $H_{DC}$ channel information is communicated from the $DUE_R$ 209 to the access point 202 or the CUE 204 may depend on whether the access point 202 or the CUE 204 determines the associated uplink precoder. In some embodiments, the access point 202 may be configured to instruct the CUE 204 to transmit the reference signal.

In some embodiments, the CUE 204 may be configured to determine the $H_{DC}$ channel information instead of the $DUE_R$ 209 such that the CUE 204 may acquire the $H_{DC}$ channel information by locally determining (e.g., estimating) the $H_{DC}$ channel information. For example, the $DUE_R$ 209 may be configured to transmit a reference signal (e.g., an SRS), which may be received by the CUE 204 via a signal path (also referred to as a channel) that is similar to that associated with the channel $H_{DC}$. Based on the reference signal transmitted by the $DUE_R$ 209, the CUE 204 may estimate channel information associated with the channel from the $DUE_R$ 209 to the CUE 204.

In a TDD scheduling scheme, the channel from the $DUE_R$ 209 to the CUE 204 may be symmetrical to the channel $H_{DC}$. Accordingly, when the CUE 204 and the $DUE_R$ 209 operate in a TDD scheduling scheme, the CUE 204 may estimate the $H_{DC}$ channel information as being the same as the estimated channel information associated with the channel from the $DUE_R$ 209 to the CUE 204.

Additionally, in some embodiments, in an FDD scheduling scheme the same frequencies may be used for D2D communications to or from the $DUE_T$ 207 (e.g., reference signals transmitted by the $DUE_R$ 209) as those used by the CUE 204 for uplink communications to the access point 202. Accordingly, in some embodiments, when an FDD scheduling scheme is employed, the CUE 204 may estimate channel information associated with the channel from the $DUE_R$ 209 to the CUE 204 based on the reference signal transmitted by the $DUE_R$ 209. The CUE 204 may then estimate the $H_{DC}$ channel information as being the same as the estimated channel information associated with the channel from the $DUE_R$ 209 to the CUE 204 because substantially the same or the same frequencies may be used.

As mentioned above, the D2D precoder associated with the D2D signal transmitted by the $DUE_T$ 207 to the $DUE_R$ 209 may be determined based on the $H_D$ channel information and the $H_{CD}$ channel information such that interference of uplink communications (e.g., the uplink signal transmitted by the CUE 204 and received by the access point 202) that may be caused by the D2D signal may be reduced and/or minimized. In some embodiments, the reduction in interference may be achieved by selecting as the D2D precoder a precoder that yields a maximum SLNR of the D2D signal over the channel $H_D$ with respect to the channel $H_{CD}$.

For example, in some embodiments, the D2D precoder may be determined by determining an eigenvector corresponding to the largest eigenvalue of a matrix represented by the following expression:

$$(\sigma^2_C + p_D H_{CD}{}^H H_{CD})^{-1} H_D{}^H H_D$$

In the above expression, "$\sigma^2_C$" may represent noise and background interference power at the access point 202; "$p_D$" may represent a transmission power of the D2D signal; "$H_{CD}$" may represent a channel matrix that includes the $H_{CD}$ channel information; "$H_{CD}{}^H$" may represent the complex conjugate of the transpose of the channel matrix "$H_{CD}$"; "$H_D$" may represent a channel matrix that includes the $H_D$ channel information; and "$H_D{}^H$" may represent the complex conjugate of the transpose of the channel matrix "$H_D$." Determining the D2D precoder by determining the eigenvector corresponding to the largest eigenvalue of the matrix represented by the above expression may give a maximum SLNR of the D2D signal over the channel $H_D$ with respect to the channel $H_{CD}$.

In some embodiments, the D2D precoder may be selected from a codebook that includes a set of predetermined precoders referred to as codewords. In these or other embodiments, a codeword of the codebook that is closest to a precoder determined by the eigenvector corresponding to the largest eigenvalue of the matrix represented by the above expression may be selected as the D2D precoder. For example, the D2D precoder may be selected according to the following expression in some embodiments:

$$w_D^* = \mathrm{argmin}_{w \in W_D} \|w - w_D\|$$

In the above expression, "$w_D$" may represent the D2D precoder; "$W_D$" may represent the codebook; "$w$" may represent a codeword of the codebook "$W_D$"; and "$W_D$" may represent the precoder determined by the eigenvector corresponding to the largest eigenvalue of the matrix represented by the expression "$(\sigma^2_C + p_D H_{CD}{}^H H_{CD})^{-1} H_D{}^H H_D$."

In some embodiments, the D2D precoder may be selected from the codebook by determining which codeword may result in the largest SLNR of the D2D signal over the channel $H_D$ with respect to the channel $H_{CD}$. For example, in some embodiments, the D2D precoder may be determined by the following expression:

$$w_D^* := \mathrm{argmax}_{w \in W_D} \left( \frac{p_D \|H_D w\|^2}{\sigma^2_C + p_D \|H_{CD} w\|^2} \right)$$

In the above expression, "$w_D$" may represent the D2D precoder; "$W_D$" may represent the codebook; "$w$" may represent a codeword of the codebook "$W_D$"; "$\sigma^2_C$" may represent noise and background interference power at the access point 202; "$p_D$" may represent the transmission power of the D2D signal; "$H_{CD}$" may represent a channel matrix that includes the $H_{CD}$ channel information; "$H_D$" may represent a channel matrix that includes the $H_D$ channel information; and the expression $$\left( \frac{p_D \|H_D w\|^2}{\sigma^2_C + p_D \|H_{CD} w\|^2} \right)$$

may represent the SLNR of the D2D signal over the channel $H_D$ with respect to the channel $H_{CD}$.

In some embodiments, such as when there are multiple D2D pairs sharing the same uplink channel resources, the uplink precoder associated with the uplink signal transmitted by the CUE 204 to the access point 202 may be determined in a traditional manner without accounting for interference that the uplink signal may cause on D2D communications. In other embodiments, similar to the D2D signal precoder, the uplink precoder may be determined based on the $H_C$ channel information and the $H_{DC}$ channel information such that interference of D2D communications (e.g., the D2D signal transmitted by the $DUE_T$ 207 and received by the $DUE_R$ 209) that may be caused by the uplink signal may be reduced and/or minimized. In some embodiments, the reduction in interference may be achieved by selecting as the uplink precoder a precoder that yields a maximum SLNR of the cellular signal over the channel $H_C$ with respect to the channel $H_{DC}$.

For example, in some embodiments, the uplink precoder may be determined by determining an eigenvector corresponding to the largest eigenvalue of a matrix represented by the following expression:

$$(\sigma^2_D + p_C H_{DC}{}^H H_{DC})^{-1} H_C{}^H H_C$$

In the above expression, "$\sigma^2_D$" may represent noise and background interference power at the $DUE_R$ 209; "$p_C$" may represent a transmission power of the uplink signal; "$H_{DC}$" may represent a channel matrix that includes the $H_{DC}$ channel information; "$H_{DC}{}^H$" may represent the complex conjugate of the transpose of the channel matrix "$H_{DC}$"; "$H_C$" may represent a channel matrix that includes the $H_C$ channel information; and "$H_C{}^H$" may represent the complex conjugate of the transpose of the channel matrix "$H_C$." Determining the uplink precoder by determining the eigenvector corresponding to the largest eigenvalue of the matrix represented by the above expression may give a maximum SLNR of the uplink signal over the channel $H_C$ with respect to the channel $H_{DC}$.

In some embodiments, the uplink precoder may be selected from a codebook, which may be the same as the codebook used to determine the D2D precoder in some instances. For example, the uplink precoder may be selected according to the following expression in some embodiments:

$$w_C^* := \mathrm{argmin}_{w \in W_D} \|w - w_C\|$$

In the above expression, "$w_C^*$" may represent the uplink precoder; "$W_D$" may represent the codebook; "$w$" may represent a codeword of the codebook "$W_D$"; and "$w_C$" may represent the precoder determined by the eigenvector corresponding to the largest eigenvalue of the matrix represented by the expression "$(\sigma_D^2 + p_C H_{DC}^H H_{DC})^{-1} H_C^H H_C$."

In some embodiments, the uplink precoder may be selected from the codebook by determining which codeword may result in the largest SLNR of the uplink signal over the channel $H_C$ with respect to the channel $H_{DC}$. For example, in some embodiments, the uplink precoder may be determined by the following expression:

$$w_C^* := \mathrm{argmax}_{w \in W_D} \left( \frac{p_C \|H_C w\|^2}{\sigma_D^2 + p_C \|H_{DC} w\|^2} \right)$$

In the above expression, "$w_C$" may represent the uplink precoder; "$W_D$" may represent the codebook; "$w$" may represent a codeword of the codebook "$W_D$"; "$\sigma_D^2$" may represent noise and background interference power at the $DUE_R$ 209; "$p_C$" may represent the transmission power of the uplink signal; "$H_{DC}$" may represent a channel matrix that includes the $H_{DC}$ channel information; "$H_C$" may represent a channel matrix that includes the $H_C$ channel information; and the expression $$\left( \frac{p_C \|H_C w\|^2}{\sigma_D^2 + p_C \|H_{DC} w\|^2} \right)$$

may represent the SLNR of the uplink signal over the channel $H_C$ with respect to the channel $H_{DC}$.

As illustrated above, the D2D precoder and the uplink precoder may be determined independently of each other, which may reduce complexity as compared to systems where they are determined with respect to each other. Additionally, the D2D precoder and/or the uplink precoder may be determined in the present disclosure to consider potential interference that may be caused by their associated signals. In some embodiments, once the precoders have been determined, the amount of interference that may be caused may be determined. In some embodiments, the interference determination may be used to determine the channel quality for uplink signals transmitted in the same uplink channel resources as the D2D signals.

For example, in some embodiments, the access point 202 may be configured to determine the amount of interference in received uplink communications that may be caused by one or more D2D signals based on the D2D precoders of the D2D signals. By way of example, the access point 202 may determine the interference that may be caused by a D2D signal using the following expression:

$$p_D \|H_{CD} w_D^*\|^2$$

In the above expression, "$p_D$" may represent the transmission power of the D2D signal; "$H_{CD}$" may represent the channel matrix including the $H_{CD}$ channel information; and "$w_D^*$" may represent the D2D precoder. When there are multiple D2D signals sharing the same uplink signal resources, the access point 202 may use the above expression for each of the D2D signals and their respective precoders to determine the interference that may be caused by each D2D signal. The access point 202 may then add the interference that may be caused by each D2D signal to determine a total amount of interference that may be caused by the D2D signals.

In these or other embodiments, the access point 202, the $DUE_T$ 207 and/or the $DUE_R$ 209 may determine interference of a particular D2D signal that may be caused by other D2D signals and/or uplink signals that may be transmitted in the same uplink signal resources as the particular D2D signal. The interference of the D2D signals may be determined in a similar manner as that described above with respect to the interference of the uplink signals. The determined interference may be used by the network 200 to determine factors such as the quality of communications (e.g., D2D and/or cellular communications) performed within the network 200.

Figure 3:
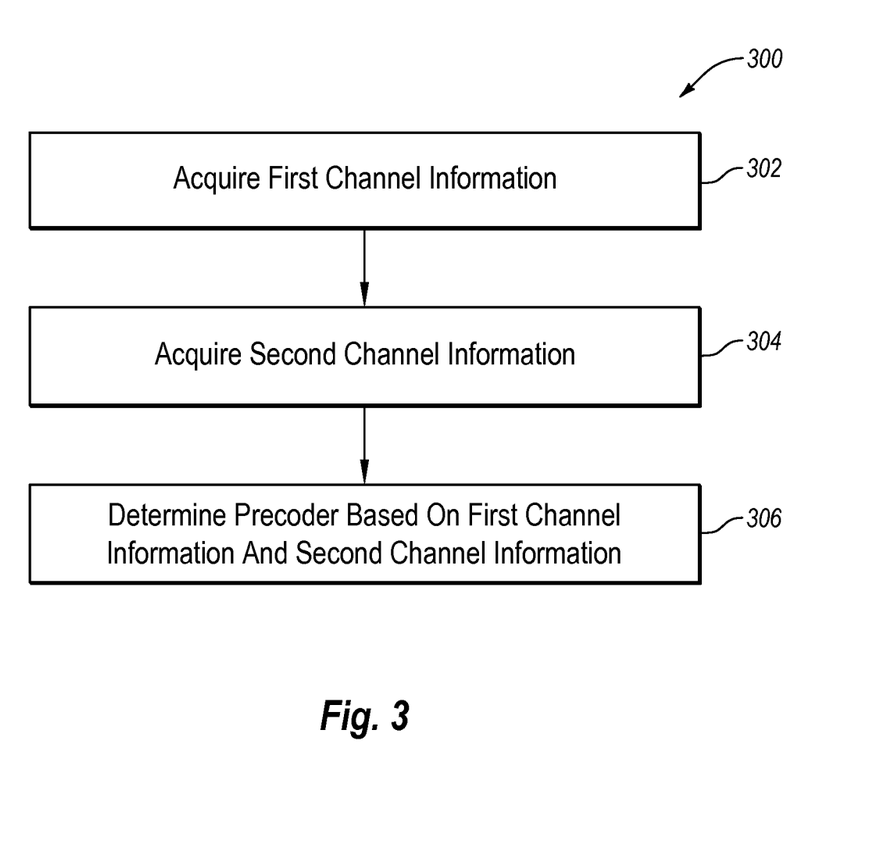
FIG. 3 is a flowchart of an example method of determining a precoder in wireless communications.

FIG. 3 is a flowchart of an example method 300 of determining a precoder in wireless communications, arranged in accordance with at least one embodiment of the present disclosure. The method 300 may be implemented, in some embodiments, by a wireless communication network, such as the networks 100 or 200 described with respect to FIGS. 1 and 2, respectively. Although illustrated as discrete blocks, various blocks may be divided into additional blocks, combined into fewer blocks, or eliminated, depending on the desired implementation.

The method 300 may begin at block 302 where first channel information associated with a first channel between a first node of a wireless communication network and a second node of the wireless communication network may be acquired. The first node may be configured to transmit a first wireless signal in a wireless communication resource to the second node via the first channel. In some embodiments, the first channel information may be determined based on a reference signal transmitted by the first node and received at the second node or based on a reference signal transmitted by the second node and received at the first node, as described above.

Additionally, in some embodiments, the first channel information may be acquired by locally determining the first channel information or by receiving the first channel information from another node. For example, in some embodiments, the first node may acquire the first channel information by locally determining the first channel information based on a reference signal transmitted by the second node. Alternatively, the first node may acquire the first channel information by receiving it from the second node, which may locally determine the first channel information based on a reference signal transmitted by the first node. In these or other embodiments, another node may acquire the first channel information from the first node and/or the second node.

At block 304, second channel information associated with a second channel between the first node and a third node of the wireless communication network may be acquired. The third node may be configured to receive a second wireless signal transmitted in substantially the same wireless communication resource as the first wireless signal. In some embodiments, the second channel information may be determined based on a reference signal transmitted by the first node and received at the third node or based on a reference signal transmitted by the third node and received at the first node, as described above.

Further, in some embodiments, the second channel information may be acquired by locally determining the second channel information or by receiving the second channel information from another node. For example, in some embodiments, the first node may acquire the second channel information by locally determining the second channel information based on a reference signal transmitted by the third node. Alternatively, the first node may acquire the second channel information by receiving it from the third node, which may locally determine the second channel information based on a reference signal transmitted by the first node. In these or other embodiments, another node may acquire the second channel information from the first node and/or the third node.

In some instances, the first node may be a transmitting D2D device of a D2D pair, the second node may be a receiving D2D device of the D2D pair, and the third node may be an access point of the wireless communication network. In other instances, the first node may be a cellular wireless device, the second node may be a wireless communication network access point, and the third node may be a receiving D2D device of a D2D pair.

At block 306, a precoder for transmission of the first wireless signal may be determined based on the first channel information and the second channel information. In some embodiments, the precoder may be determined by determining a signal-to-leakage-and-noise ratio (SLNR) of the first wireless signal with respect to the second wireless signal based on the first channel information and the second channel information such that interference of the second wireless signal as caused by the first wireless signal is reduced One skilled in the art will appreciate that, for method 300 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, in some embodiments, the method 300 may include determining interference of the second wireless signal as caused by the first wireless signal based on the precoder.

Embodiments described herein may be implemented using computer-readable media for carrying or having computer-executable instructions or data structures stored thereon. For example, the wireless devices and/or access points described above may include computer-readable media having computer-executable instructions or data structures stored thereon for performing the functions and operations described above. Such computer-readable media may be any available media that may be accessed by a general purpose or special purpose computer (e.g., a processor). By way of example, and not limitation, such computer-readable media may include a non-transitory or tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein may be described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system. In the present disclosure, the wireless devices and/or access points described above may include such hardware configured to perform the operations described herein.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    acquiring first channel information associated with a first channel between a first node of a wireless communication network and a second node of the wireless communication network, the first node being configured to transmit a first wireless signal in a wireless communication resource to the second node via the first channel;
    acquiring second channel information associated with a second channel between the first node and a third node of the wireless communication network, the third node being configured to receive a second wireless signal transmitted in the wireless communication resource; and
    determining a precoder for transmission of the first wireless signal based on the first channel information and the second channel information, wherein determining the precoder includes determining a signal-to-leakage-and-noise ratio (SLNR) of the first wireless signal with respect to the second wireless signal based on the first channel information and the second channel information such that interference of the second wireless signal as caused by the first wireless signal is reduced.

2. The method of claim 1, wherein:
    the first node is a transmitting wireless device of a device-to-device (D2D) pair of wireless devices;
    the second node is a receiving wireless device of the D2D pair; and
    the third node is an access point of the wireless communication network.

3. The method of claim 1, wherein:
the first node is a wireless device;
the second node is an access point of the wireless communication network; and
the third node is a receiving wireless device of a device-to-device (D2D) pair of wireless devices.

4. The method of claim 1, wherein the first channel information is based on a reference signal transmitted by the second node and received at the first node.

5. The method of claim 1, wherein the first channel information is based on a reference signal transmitted by the first node and received at the second node.

6. The method of claim 1, wherein the second channel information is based on a reference signal transmitted by the third node and received at the first node.

7. The method of claim 1, wherein the second channel information is based on a reference signal transmitted by the first node and received at the third node.

8. The method of claim 1, wherein:
acquiring the first channel information includes locally determining the first channel information or receiving the first channel information; and
acquiring the second channel information includes locally determining the second channel information or receiving the second channel information.

9. The method of claim 1, further comprising determining interference of the second wireless signal as caused by the first wireless signal based on the precoder.

10. A non-transitory computer-readable medium having encoded therein computer-executable instructions to perform operations, the operations comprising:
acquiring first channel information associated with a first channel between a first node of a wireless communication network and a second node of the wireless communication network, the first node being configured to transmit a first wireless signal in a wireless communication resource to the second node via the first channel;
acquiring second channel information associated with a second channel between the first node and a third node of the wireless communication network, the third node being configured to receive a second wireless signal transmitted in the wireless communication resource; and
determining a precoder for transmission of the first wireless signal based on the first channel information and the second channel information, wherein determining the precoder includes determining a signal-to-leakage-and-noise ratio (SLNR) of the first wireless signal with respect to the second wireless signal based on the first channel information and the second channel information such that interference of the second wireless signal as caused by the first wireless signal is reduced.

11. The non-transitory computer-readable medium of claim 10, wherein:
the first node is a transmitting wireless device of a device-to-device (D2D) pair of wireless devices;
the second node is a receiving wireless device of the D2D pair; and
the third node is an access point of the wireless communication network.

12. The non-transitory computer-readable medium of claim 10, wherein:
the first node is a wireless device;
the second node is an access point of the wireless communication network; and
the third node is a receiving wireless device of a device-to-device (D2D) pair of wireless devices.

13. The non-transitory computer-readable medium of claim 10, wherein the first channel information is based on a reference signal transmitted by the second node and received at the first node.

14. The non-transitory computer-readable medium of claim 10, wherein the first channel information is based on a reference signal transmitted by the first node and received at the second node.

15. The non-transitory computer-readable medium of claim 10, wherein the second channel information is based on a reference signal transmitted by the third node and received at the first node.

16. The non-transitory computer-readable medium of claim 10, wherein the second channel information is based on a reference signal transmitted by the first node and received at the third node.

17. The non-transitory computer-readable medium of claim 10, wherein:
acquiring the first channel information includes locally determining the first channel information or receiving the first channel information; and
acquiring the second channel information includes locally determining the second channel information or receiving the second channel information.

18. The non-transitory computer-readable medium of claim 10, wherein the operations further comprise determining interference of the second wireless signal as caused by the first wireless signal based on the precoder.

* * * * *